Dec. 15, 1953   L. F. BEACH   2,662,301
GYROSCOPIC COMPASS CORRECTION SYSTEM
Filed Nov. 21, 1951   2 Sheets-Sheet 1
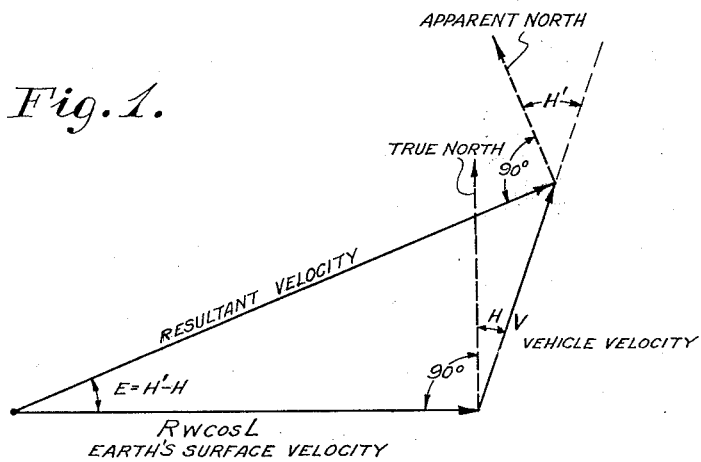
Fig.1.
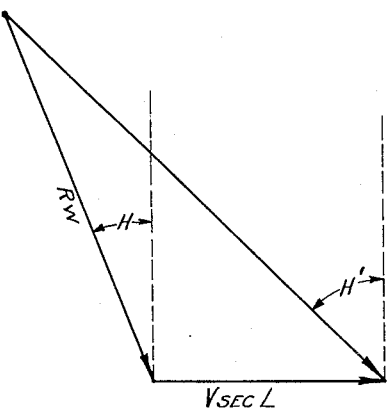
Fig.2.
Fig.3.
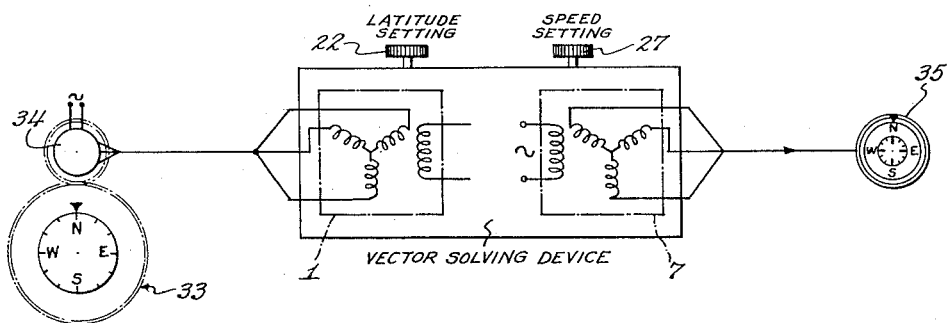
INVENTOR
LENNOX F. BEACH
BY
Herbert H. Thompson
his ATTORNEY

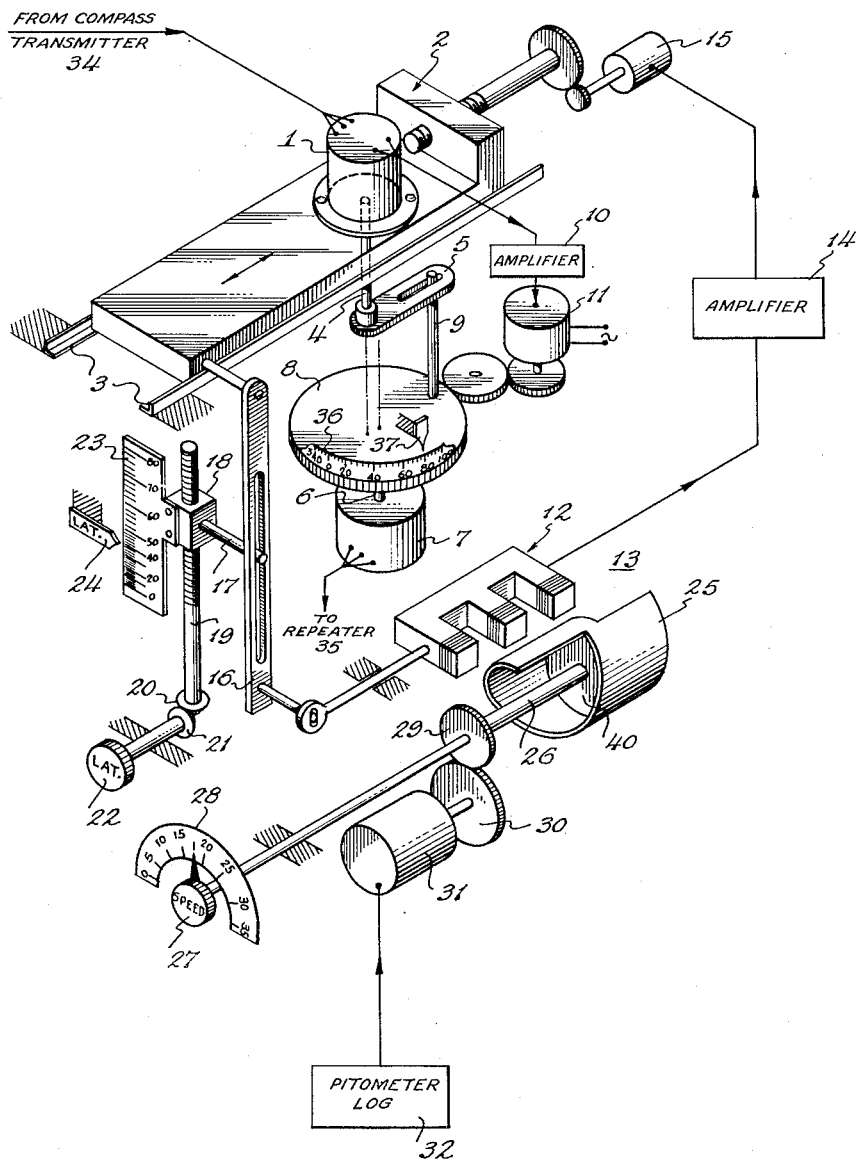

Patented Dec. 15, 1953

2,662,301

UNITED STATES PATENT OFFICE 2,662,301

GYROSCOPIC COMPASS CORRECTION SYSTEM

Lennox F. Beach, Sea Cliff, N. Y., assignor to The Sperry Corporation, a corporation of Delaware Application November 21, 1951, Serial No. 257,539

6 Claims. (Cl. 33—226)

My invention relates to systems for correcting gyroscopic compasses for their speed error, and involves improvements of devices of the type disclosed in Patent No. 2,128,559, issued August 30, 1938, to W. G. Harding et al. for a Gyroscopic Compass and assigned to the assignee of the present application.

A gyroscopic compass aligns itself perpendicularly to the direction of its total velocity relative to a non-rotating frame of reference with origin at the earth's center. This velocity is the resultant of the rotational velocity of the earth's surface and the velocity of the compass over the earth. Thus, with no velocity of the compass over the earth or with said velocity in an E-W direction, the compass will align itself with its meridian and indicate true north. Yet, when the compass is installed in a moving vehicle such as a ship whose velocity has a northerly or southerly component, the compass will settle off the meridian and indicate an apparent north different from true north. The amount of this difference is generally termed the speed error of the compass.

In order to calculate and apply a correction for compensating a gyroscopic compass for its speed error, a vector solving device as described in the foregoing Patent No. 2,128,559, may be employed. However, when a gyroscopic compass is thus fitted out, its bulk, weight and complexity are substantially increased by the mechanical members comprising the vector solver. A larger azimuth motor too, is required to cope with the added load of said mechanical members and to move the lubber ring relative to the compass card in accordance with the speed error. Moreover, the adjustments for speed and latitude must be made at the compass itself; hence, the compass must be installed in premium space where such adjustments may be conveniently made. Additionally, it is seen that to set by automatic means the devices used, as suggested, said means would further burden the compass.

One arrangement which overcomes the foregoing disadvantages is described in Patent No. 2,273,808, issued February 17, 1942, to W. G. Harding et al. for a System for Transmitting Indications, and is assigned to the assignee of the present application. Said arrangement effects the requisite correction by means added to the data transmission system of a gyroscopic compass. To this end, the compass transmitter is electrically connected with a remotely located signal generator. A direct mechanical connection is made from the rotor of the signal generator to the rotor of a relay transmitter which actuates a repeater compass. A power takeoff on said direct mechanical connection drives a cam-type corrector, and the output of the corrector is employed to rotate the stator of the signal generator. It is evident, therefore, that the corrector constitutes an appendage or an attachment in the data transmission system of the gyroscopic compass. Such an arrangement requires the addition of slip rings on the stator of the signal generator. Moreover, a servomotor must be used which is sufficiently large and powerful to drive not only the corrector and its gearing but also the signal generator stator and its gearing.

According to my invention, the corrector forms an integral part of the data transmission system of a gyroscopic compass. In this regard, the compass transmitter is in electrical connection with a remotely located signal generator such as a synchro control transformer. A relay transmitter is provided to drive one or more compass repeaters; but, instead of a direct mechanical connection between the control transformer and the relay transmitter, I prefer to interpose the corrector itself therebetween. Accordingly, a variable motion device, which may take the form of a slotted arm and crank pin rotatable about axes that may be laterally spaced or offset in substantial parallelism, is used mechanically to couple the rotor of the control transformer to the rotor of the relay transmitter. In this fashion, a cyclic or non-proportional rotation occurs between the shafts of the control transformer and the relay transmitter so long as their respective shaft axes are offset. My invention includes means for offsetting or spacing said shafts in accordance with measures of vehicle speed and vehicle latitude. Such means may also include means for automatically introducing said measures of vehicle speed.

The placing of the corrector so that it constitutes the coupling between the input and the output of the data transmission system, rather than as a device adjunct to a direct coupling therebetween, has disposed of the necessity for using the slip rings present in the foregoing Patent No. 2,273,808. Further, the amount of gearing required has been substantially reduced. Moreover, the servomotor required in the present invention between the control transformer and the relay transmitter needs only to develop sufficient torque to turn the relatively light rotors of said transformer and said transmitter.

It is an object of my invention to provide a vector solving type of speed error corrector for a gyroscopic compass in a location remote from the compass, preferably between the compass heading transmitter and one or more repeaters actuated thereby.

Another object is the provision of the foregoing type of corrector to serve as the coupling between a signal generator which receives apparent heading data from a compass transmitter and a relay transmitter which actuates one or more compass repeaters.

Another object of my invention is to provide means remotely located from a gyroscopic compass for automatically setting a speed error corrector for the compass in accordance with the speed of the vehicle carrying said compass.

Another object is the provision of a novel inductive pick-off having a helically formed armature.

With the foregoing and still other objects in view, my invention includes the novel combinations and arrangements of elements described below and illustrated in the accompanying drawings, in which—

Fig. 1 is a vector diagram showing the vectors involved in the gyroscopic compass speed error correction problem;

Fig. 2 is a vector diagram of Fig. 1 redrawn so that the vector representing vehicle velocity is the base, and all sides are multiplied by the secant of latitude;

Fig. 3 is a schematic diagram showing a preferred arrangement of several of the elements of the present invention and their relation one to the other; and Fig. 4 is a schematic diagram showing in detail a preferred embodiment of the present invention wherein a vector solution of the heading correction problem is obtained.

Before describing the gyroscopic compass correction system of my invention represented by Figs. 3 and 4, it appears preferable to convey at first a conception of the principles upon which the invention is founded and in what manner those principles are incorporated in a data transmission system for a compass.

Accordingly, Fig. 1 represents the vector relationship between the earth's surface velocity $Rw \cos L$ and a given vehicle velocity V, where R is the earth's radius, $w$ is the angular velocity of the earth, and L is the vehicle latitude. Adding the two vectors gives a resultant velocity vector as shown. The gyroscopic compass aligns itself perpendicularly to its resultant velocity and therefore indicates an apparent north different from true north, as indicated in the vector diagram. It can be shown that the difference between the vehicle apparent heading H' and its true heading H is equivalent to the angle E between the resultant velocity vector and the earth's surface velocity vector. Said difference is termed the speed error of the compass.

In Fig. 2, the velocity vector triangle of Fig. 1 has been tipped on its vehicle velocity side and all sides thereof have been multiplied by sec L. Hence, the variable term cos L has been taken out of the earth's surface velocity vector, this vector then representing earth's surface velocity at the equator and being constant regardless of changes in vehicle latitude. The true and apparent heading angles are shown in different positions to facilitate comparison with Fig. 4, which shows a physical embodiment of Fig. 2. In showing the physical embodiment of Fig. 2, Fig. 4 also sets forth in detail the vector solving device generally represented in Fig. 3 defining the relation, one to the other, of several of the elements of the present invention.

Referring to Fig. 4, a signal generator such as a synchro control transformer 1 is supported on a carriage 2 which is movable laterally along suitable guides 3. Having a rotor shaft 4 to which is fixed a slotted arm 5, control transformer 1 is preferably mounted so that said shaft is substantially parallel to the rotor shaft 6 of a relay transmitter 7 which may be a synchro generator or other suitable device. Fixed to shaft 6 is a disc 8; and eccentric to the disc and extending upwardly therefrom is a crank pin 9 which engages the slot of arm 5, the pin and slot comprising a variable motion coupling between shaft 4 of transformer 1 and shaft 6 of transmitter 7. Transmitter 7 is in electrical connection with one or more compass repeaters 35 (Fig. 3) which may be synchro motors or other suitable devices, and is provided to actuate said repeaters in accordance with true or corrected heading H.

Control transformer 1 forms part of a servo loop which positions rotor shaft 4 of said transformer in accordance with the apparent or uncorrected heading H' of a gyroscopic compass 33 (Fig. 3). In this regard, compass 33 drives a compass transmitter 34 which may be a synchro generator or other suitable device and which is in electrical connection with remotely located control transformer 1. A conventional servo amplifier 10 amplifies the signal output of the control transformer and therewith actuates a servomotor 11 to position rotor shaft 4 of control transformer 1 in direct angular correspondence with the rotor of compass transmitter 34. Said positioning of rotor shaft 4 is effected from the servomotor through suitable gearing and the variable motion coupling between shafts 4 and 6. Moreover, the several elements of my invention are so oriented that the axes of shafts 4 and 6 are in substantial lateral or axial alignment for a latitude $L=0$, and the slot in arm 5 runs in the same direction as the sliding movements of carriage 2 for compass headings of due east and due west.

By the foregoing arrangement, I have synthesized the vector relationships of Fig. 2; and it will become apparent that when the lateral spacing between shafts 4 and 6 is set in proportion to $V \sec L$, and the distance between shaft 6 and the base of pin 9 is made proportional to earth's surface velocity at the equator or $Rw$, then the distance measured along arm 5 from shaft 4 to pin 9 is proportional to the resultant velocity vector. Thus, with shaft 4 and arm 5 being turned through the apparent heading angle H', shaft 6, disc 8, and pin 9 turn through an angle equal to the true heading H. This being the case, it is evident that in addition to transmitting true heading data to repeater 35, relay transmitter 7 may be adapted to directly indicate such data through the expedient of a compass card 36 fixed concentrically to disc 8 and cooperating with a suitable lubber means 37.

In order to space the shafts 4, 6 in accordance with $V \sec L$, sliding movement is imparted to carriage 2 by servo means including a two-part signal generator or pick-off 13, whose signal output is amplified by an amplifier 14 to actuate a servomotor 15, which is adapted by suitable gearing to slide carriage 2 along its guides 3. The sec L portion of $V \sec L$ is introduced by a slotted follow-up link 16 pivotally connected at one end to one part of pick-off 13, which part may be a core 12. The other end of link 16 is pivotally connected to carriage 2. Disposed within the slot of link 16 is a pin 17 which is positionable along the length of said slot. In order to position pin 17, I have connected the pin to a traveling nut 18 which meshes with a screw 19, at the end of which is fixed a bevel gear 20 meshing with another bevel gear 21. A knob 22 is provided for rotating screw 19 through gears 20, 21. A scale 23 calibrated in accordance with sec L is fixed to nut 18 and cooperates with a fixed pointer 24 so that the turning of knob 22 sets pin 17 for the latitude L of the vehicle. That is to say, scale 23 is so calibrated that the ratio of the upper lever arm (the distance from pin 17 to the upper pivot) to the lower lever arm (the distance from pin 17 to the lower pivot) is made proportional to sec L.

To introduce the V portion of V sec L, an armature 25, constituting the other part of pick-off 13 is concentrically fixed by means of support 40 to shaft 26 which is rotated through an angular distance proportional to vehicle speed. To so position shaft 26, manual means may be employed consisting of the knob 27 fixed to shaft 26 and having a pointer which cooperates with a scale 28 calibrated in terms of vehicle speed.

For pick-off 13, I prefer to employ an inductive type of signal generator whose core 12 constitutes a three-legged transformer. The center leg or primary winding is continuously excited from a single-phase A. C. source, while the outer legs or secondary windings are connected in series opposition so that their output is normally balanced. Armature 25 is made of soft iron or other material of suitable permeability, and its support 40 for best results, is non-magnetic. Preferably, armature 25 is formed so that its sides comprise spaced helices of substantially equal pitch and diameter. By virtue of its helical form, therefore, the ribbon-like armature presents, adjacent core 12, a surface which advances or regresses longitudinally with respect to the core depending on the armature's direction of rotation, thereby relatively varying the reluctance of the two magnetic paths of the core. If the potentials of the outer legs of core 12 are balanced when the armature surface is central with respect to the core, then it is apparent that any rotational movement of the armature surface unbalances said potentials due to an increase in the air gap on one side of the core as compared to the other. Moreover, the unbalanced potentials have a phase relationship indicative of the direction of movement between the core and the armature surface. Hence, amplifier 14 which receives the differential output of pick-off 13 is preferably a phase-sensitive amplifier capable of driving motor 15 in the direction corresponding to the phase of said differential output.

By this arrangement, the rotation of armature 25 for a speed change results in carriage 2 being slidably moved on its guides 3. The consequent speed-signal offset or spacing of shafts 4, 6 is modified in accordance with the position of pin 17 which is set for vehicle latitude in follow-up link 16. Accordingly, the actual offset is proportional to both V and to sec L; and, therefore, is proportional to the product V sec L. With the offset so proportioned, it follows that shaft 6 will be rotatably driven through an angular distance proportional to true or corrected heading H if shaft 4 is rotated through an angular distance proportional to apparent or uncorrected heading H'.

While thus far I have described a manual means to position speed shaft 26, my correction system is especially well-suited for accepting an automatic input of vehicle speed data. In this regard, I have provided a pinion 29 fixed to shaft 26 and meshing with a pinion 30 which is fixed to the shaft of a synchro motor 31. It will be apparent to those skilled in the art that motor 31 may be driven through an angular rotation in proportion to a speed signal derived from any suitable speed sensing device available, such as, for example, the pitometer log 32 of a ship.

Since many changes could be made in the above construction and many apparently widely different embodiments of this invention could be made without departing from the scope thereof, it is intended that all matter contained in the foregoing description or shown in the accompanying drawings shall be interpreted as illustrative and not in a limiting sense.

What is claimed is:

1. In a correction system for gyroscopic compasses on mobile craft, a gyroscopic compass in combination with a data transmission system for driving a compass repeater, said transmission system comprising a first synchro generator driven in accordance with uncorrected compass heading, a synchro control transformer in follow-up relation with said first generator and having a rotor shaft, a slotted arm fixed to said rotor shaft, a second synchro generator also having a rotor shaft, a crank pin fixed to the shaft of said second generator and eccentric thereto by an amount proportional to earth's surface velocity at the equator, said pin being adapted to engage the slot of said slotted arm, and means for laterally spacing said shafts in accordance with measures of craft speed and latitude, said last recited means comprising movable means to support the synchro control transformer, servo means to position the supporting means and including a two-part signal generating means, each part displaceable relative to the other, a slotted follow-up link connecting one part of the generating means to the supporting means, pivot means disposed within the slot of the slotted link and positionable along the length of said slot, means to position said pivot means in accordance with the secant of craft latitude, and servo means to displace the second part of the generating means relative to the first part thereof in accordance with craft speed.

2. A pick-off device of the E-transformer type comprising a longitudinally extending core having laterally extending legs forming a generally E-shaped structure, exciting and pick-off windings on said legs, and an armature rotatably supported on an axis substantially parallelling the longitudinal axis of said core, said armature having a flat ribbon-like surface of magnetic material arranged in the form of a helix and disposed magnetically to cooperate with said core.

3. An inductive pick-off comprising a longitudinally extending transformer core having three legs, a coil wound about each leg, a source of A.-C. for exciting the coil on one leg, means connecting the other coils to form a normally balanced output circuit, an armature partially disposed magnetically to cooperate with said core and rotatable with respect thereto about an axis substantially parallelling the longitudinal axis of the core, said armature having a flat ribbon-like surface of magnetic material arranged in the form of a helix, and means for rotating the armature whereby that portion of the armature which is disposed in magnetically cooperable relation to the core effectively moves longitudinally along said axis of rotation of the armature to unbalance said output circuit.

4. The combination with a gyroscopic compass for mobile craft of apparatus for providing compass-derived heading data corrected for the northerly speed error of said compass, said apparatus comprising a first rotatably-mounted member, a second rotatably-mounted member, variable motion means interconnecting said members and adapted on rotation of one of said members to effect a simultaneous rotation of the other through a different angular distance depending on the spacing of said members, and servomechanism means adapted to space said members in accordance with measures of craft speed and latitude, said last-recited means comprising a pick-off element adapted to be displaced from a zero signal output condition thereof in accordance with craft speed, means responsive to the signal output of said element and connected to move the mounting of one of said members for spacing said one of said members relative to the other, adjustable motion-transmitting means connecting said mounting to said element in follow-up relation, and means for adjusting said adjustable means in accordance with a measure of craft latitude, whereby on rotation of said first member in accordance with uncorrected heading said second member is rotated through an angular distance proportional to corrected heading.

5. The combination with a gyroscopic compass for mobile craft of apparatus for providing compass-derived heading data corrected for the northerly speed error of said compass, said apparatus comprising a first member supported for rotation about a first axis, a second member supported for rotation about a second axis parallel to the first axis, the respective supports of said members being adapted for relative movement such that the lateral spacing of said axes may be varied, variable motion means for coupling said members in driving relation, said coupling means being capable of effecting a variation in the rotational motion transmitted from one of said members to the other depending on the lateral spacing of the axes of rotation of said members, and means for varying said axial spacing in accordance with measures of craft speed and latitude, said last-recited means comprising pick-off means adapted to be displaced from a zero signal output condition in accordance with craft speed, means responsive to the signal output of said pick-off means and adapted to move one of said supports relative to the other, adjustable motion-transmitting means connecting said one support in follow-up relation to said pick-off means, and means for adjusting said adjustable means in accordance with a measure of craft latitude, whereby on rotation of said first member in accordance with uncorrected heading said second member is rotated through an angular distance proportional to corrected heading.

6. In an apparatus for correcting gyroscopic compass errors on mobile craft, first and second supporting means, first and second members respectively mounted for rotation on said first and second supporting means, first element-connecting means for coupling said members such that rotational movement of one member serves to rotate the other, pick-off means for providing a signal on actuation thereof, second element-connecting means for coupling one of said supporting means to said pick-off such that lineal movement of said one of said supporting means serves to actuate said pick-off, each of said two element-connecting means being adjustable for varying the ratio of movement of the elements coupled thereby, means for adjusting said second element-connecting means in accordance with a measure of craft latitude, servomechanism means for adjusting said first element-connecting means, said servomechanism means being adapted to respond to the signal output of said pick-off and being operatively connected to move said one of said supporting means, and means for actuating said pick-off in accordance with craft speed, whereby on rotation of said first member through an angular distance proportional to uncorrected compass heading said second member will be rotated through an angular distance proportional to corrected compass heading.

LENNOX F. BEACH.

References Cited in the file of this patent

UNITED STATES PATENTS

| Number | Name | Date |
| --- | --- | --- |
| 2,128,559 | Harding et al. | Aug. 30, 1938 |
| 2,273,808 | Harding et al. | Feb. 17, 1942 |
| 2,281,286 | Harding et al. | Apr. 28, 1942 |
| 2,484,022 | Esval | Oct. 11, 1949 |

FOREIGN PATENTS

| Number | Country | Date |
| --- | --- | --- |
| 14,591 | France | Nov. 6, 1911 |
| | (1st addition to No. 426,100) | |